Nov. 30, 1948.  F. S. SULLIVAN  2,455,197

MATERIAL SUPPORTING PALLET

Filed May 9, 1946

INVENTOR.
Franklin Stemple Sullivan
BY
ATTORNEYS

Patented Nov. 30, 1948

2,455,197

UNITED STATES PATENT OFFICE 2,455,197

MATERIAL SUPPORTING PALLET

Franklin Stemple Sullivan, Farmington, Mich., assignor to General Motors Corporation, Detroit, Mich., a corporation of Delaware Application May 9, 1946, Serial No. 668,412

5 Claims. (Cl. 248—120)

This invention relates to pallets for handling work or other materials.

In a modern industrial plant the materials and products are transported from place to place, very often by small trucks which are operated by gas engines or storage batteries. These trucks are provided with forwardly extending arms or prongs that are adapted to be inserted under the support for the material to be carried. Other forms of lifters or hoists and other means of transportation may be employed. It is usual in connection with these trucks, lifters or hoists to provide a so-called pallet which is raised above the floor to permit the insertion of the truck or lifter arms or prongs beneath the pallet. These pallets are constructed of wood or metal and are provided with bars or legs for support. If provided with cross beams to strengthen the supporting plate they stand at an undesirable height and are heavy and cumbersome to handle, or else the truck can pick the pallet up only from two sides instead of four sides.

It is the object of the present invention to construct a pallet of minimum weight, of maximum strength and which stands only a small distance above the floor and which can be picked up from all four sides by the truck. A further object is a pallet from which the work can be lifted by passing arms under the work resting upon the pallet.

Figure 1:
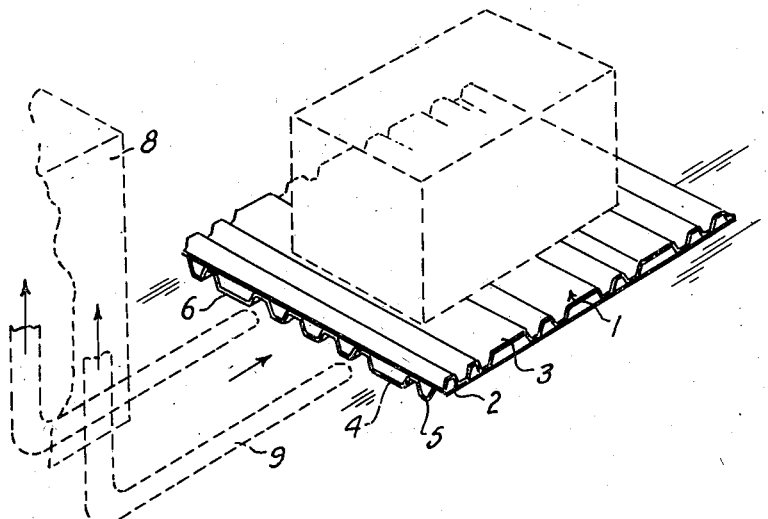
Fig. 1 is a perspective showing the pallet in relation to the truck.
Figure 2:
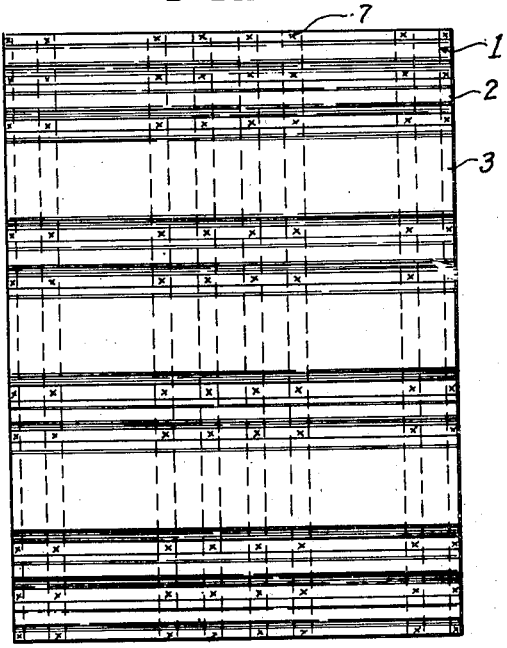
Fig. 2 is a plan view of the pallet.
Figure 4:
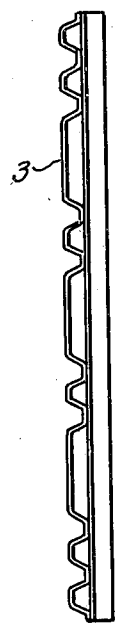
Fig. 4 is a side view of the pallet.
Figure 3:
Fig. 3 is an end view of the same.

The pallet is formed by two corrugated plates. The upper plate 1 has the narrow corrugations 2 and the wider corrugations 3. The latter provide a larger supporting surface. The under plate 4 is provided with the narrow corrugations 5 and the wider corrugations 6. These corrugations may be of any dimensions as may be required. These plates are superimposed one upon the other and spot welded or fastened together at the points 7. The wider corrugations 6 on the under plate provide a larger surface for supporting the pallet on the floor and hence prevent any creasing or marking of heavy work placed on the pallet. The truck 8 with the extended pick-up arms or prongs 9 can be inserted under the pallet at the ends, as shown in Fig. 1, the prongs going into the openings of a pair of smaller corrugations, as shown in this figure, or in the opening between the upper plate and a downwardly opening corrugation. Or the truck arms can be inserted at the side under the upper plate, entering any of the downwardly opening corrugations.

It will also be seen with this pallet that the lifting arms, whether they be on a truck or some other form of lifting apparatus, can be inserted over the top of the pallet along the upwardly opening corrugations for the purpose of getting under a stack of the work and removing the work from the pallet, when this is desirable. This cannot be done on any wooden platform pallet or any other form of pallet with which I am familiar. This is very advantageous in handling certain classes of work. It may be desired to handle this work by some other form of lifting device than an industrial truck—some form of elevator, such as a lifting crane, hoist or sling.

This pallet has great strength because the corrugations, in effect, form beams and at the same time supporting surfaces. The pallet has a plurality of cross beams by reason of the cross corrugations. At the same time the pallet can be relatively light because of great strength provided by the crossed corrugations or beams in the plates.

This pallet is much lower than the usual run of pallets, such as pallets that have legs or other supporting devices, especially the wooden type of pallet. This is very advantageous in cases where the pallet is used to truck the work into a freight car and the pallet is shipped loaded with the work. The pallet will therefore occupy less space which is advantageous in stacking the pallets for return to the supplier for again loading with work and shipping in freight cars.

The truck or lifter may approach from any side and can pick up the pallet from two of the sides by inserting the truck arms under the under plate or under the bottom of the upper plate, and can pick the pallet up from the other two sides by inserting the truck arms in the opening between the top of the bottom plate and an upwardly opening corrugation of the upper plate.

I claim:

1. A load supporting pallet for use with a lifter having pick-up arms, comprising a pair of corrugated plates having pickup-arms receiving open end corrugation placed one upon the other with the corrugations running crosswise and secured together, the said corrugations having flat bottoms which provide the contact surface with the floor and the supporting surface for the load.

2. A load supporting pallet for use with a lifter having pick-up arms, comprising a pair of plates with flat bottom open end corrugations of dimensions to take pickup-arms placed one upon the other with the corrugations running crosswise and secured together at the bottom of the channels formed by the corrugations where these channels lie together, the said flat bottoms forming the contact surface with the floor and the supporting surface for the load.

3. A load supporting pallet for use with a lifter having pick-up arms, comprising a pair of plates with flat bottom open end corrugations of dimensions to take pickup-arms placed one upon the other with the corrugations running crosswise and secured together at the bottom of the channels formed by the corrugations where these channels lie together by a metallic union, the said flat bottoms forming the contact surface with the floor and the supporting surface for the load.

4. A load supporting pallet for use with a lifter having pick-up arms, comprising a pair of relatively heavy stiff plates with flat bottom open end corrugations of dimensions to take pickup-arms placed one upon the other with the corrugations running crosswise and secured together at the bottom of the channels formed by the corrugations where these channels lie together by spot welding, the said flat bottoms forming the contact surface with the floor and the supporting surface for the load.

5. A load supporting pallet for use with a lifter having pick-up arms, comprising an upper plate formed with narrow and wide open end corrugations having flat bottoms of dimensions to take pick-up-arms and an under plate formed with similar narrow and wide corrugations having flat bottoms, the said plates being laid one upon the other with the corrugations of one plate lying crosswise the corrugations of the other plate and rigidly united, the corrugations of the upper plate having open ends to receive the arms or prongs of the lifter between the two plates from two sides and the corrugations of the under plate being open at the ends to receive the arms or prongs of the lifter from the other two sides of the pallet.

FRANKLIN STEMPLE SULLIVAN.

REFERENCES CITED

The following references are of record in the file of this patent:

UNITED STATES PATENTS

| Number | Name | Date |
| --- | --- | --- |
| 1,625,061 | Trout | Apr. 19, 1927 |
| 2,148,150 | Clark | Feb. 21, 1939 |
| 2,232,991 | Zeindler | Feb. 25, 1941 |